US006035044A

United States Patent [19]

Itoi

[11] Patent Number: 6,035,044

[45] Date of Patent: Mar. 7, 2000

[54] SCRAMBLING TYPE METHOD AND APPARATUS FOR VIDEO TRANSMISSION/RECEIPT

[75] Inventor: Satoshi Itoi, Tokyo, Japan

[73] Assignee: NEC Corporation, Tokyo, Japan

[21] Appl. No.: 08/964,374

[22] Filed: Nov. 6, 1997

[30] Foreign Application Priority Data

Nov. 7, 1996 [JP] Japan .................................... 8-295162

[51] Int. Cl.[7] .................................................... H04N 7/167

[52] U.S. Cl. .............................................................. 380/210

[58] Field of Search .................................... 380/10, 9, 14, 380/59

[56] References Cited

U.S. PATENT DOCUMENTS

| | | | |
|---|---|---|---|
| 5,535,275 | 7/1996 | Sugisaki et al. | 380/10 |
| 5,606,612 | 2/1997 | Griffin et al. | 380/14 |
| 5,757,973 | 5/1998 | Wilkinson et al. | 382/246 |

OTHER PUBLICATIONS

English translation of Japanese Office Action dated Apr. 7, 1999 (Hei 11).

*Primary Examiner*—Tod R Swann
*Assistant Examiner*—Trevor Quick Coddington
*Attorney, Agent, or Firm*—Whitham, Curtis & Whitham

[57] ABSTRACT

A scrambling type video transmitting/receiving method feasible for digital television broadcasting and an apparatus therefor are disclosed. A video transmitter executes soft scrambling with an original video signal before compressing it and then sends the softly scrambled video signal. If a video receiver descrambles the scrambled data with a scramble decoder (descrambler), a subscriber having the receiver can enjoy complete video/audio data. However, when an unauthorized person lacking the scramble decoder decodes the descrambled data, the person is allowed to see only some patterns included in a picture. This will successfully encourage the unauthorized person to make subscription so as to enjoy the complete video/audio data.

33 Claims, 18 Drawing Sheets

$$\begin{pmatrix} 15 & -2 & -1 & 0 \\ 0 & 0 & 0 & 0 \\ 0 & -3 & 2 & 1 \\ 0 & 0 & 0 & 0 \end{pmatrix}$$

Fig. 6

$$\begin{pmatrix} 15 & -2 & 0 & 0 \\ 0 & 0 & 0 & 4 \\ 0 & 0 & -2 & 0 \\ 0 & 0 & -1 & 0 \end{pmatrix}$$

| DIFFERENTIAL DC VALUE | FULL CODE LENGTH | CODEWORD | ADDITIONAL BIT |
|---|---|---|---|
| -2047 ~ -1024 | 9 + 11 | 1111 1111 1 | 00000000000 01111111111 |
| -1023 ~ -512 | 9 + 10 | 1111 1111 0 | 0000000000 0111111111 |
| -511 ~ -256 | 8 + 9 | 1111 1110 | 000000000 011111111 |
| -255 ~ -128 | 7 + 8 | 1111 110 | 00000000 01111111 |
| -127 ~ -64 | 6 + 7 | 1111 10 | 0000000 0111111 |
| -63 ~ -32 | 5 + 6 | 1111 0 | 000000 011111 |
| -31 ~ -16 | 4 + 5 | 1110 | 00000 01111 |
| -15 ~ -8 | 3 + 4 | 110 | 0000 0111 |
| -7 ~ -4 | 3 + 3 | 101 | 000 011 |
| -3 ~ -2 | 2 + 2 | 01 | 00 01 |
| -1 | 2 + 1 | 00 | 0 |
| 0 | 3 | 100 | — |
| 1 | 2 + 1 | 00 | 1 |
| 2 ~ 3 | 2 + 2 | 01 | 10 11 |
| 4 ~ 7 | 3 + 3 | 101 | 100 111 |
| 8 ~ 15 | 3 + 4 | 110 | 1000 1111 |
| 16 ~ 31 | 4 + 5 | 1110 | 10000 11111 |
| 32 ~ 63 | 5 + 6 | 1111 0 | 100000 111111 |
| 64 ~ 127 | 6 + 7 | 1111 10 | 1000000 1111111 |
| 128 ~ 255 | 7 + 8 | 1111 110 | 10000000 11111111 |
| 256 ~ 511 | 8 + 9 | 1111 1110 | 100000000 111111111 |
| 512 ~ 1023 | 9 + 10 | 1111 1111 0 | 1000000000 1111111111 |
| 1024 ~ 2047 | 9 + 11 | 1111 1111 1 | 10000000000 11111111111 |

Fig. 8A 81 82 83

| R / L | LENGTH | CODEWORD |
|---|---|---|
| EOB | 2 | 10 |
| 0/1 | 2 | 1 s (NOTE 2) |
| 0/1 | 3 | 11 s (NOTE 3) |
| 1/1 | 4 | 011 s |
| 0/2 | 5 | 0100 s |
| 2/1 | 5 | 0101 s |
| 0/3 | 6 | 0010 1 s |
| 3/1 | 6 | 0011 1 s |
| 4/1 | 6 | 0011 0 s |
| 1/2 | 7 | 0001 10 s |
| 5/1 | 7 | 0001 11 s |
| 6/1 | 7 | 0001 01 s |
| 7/1 | 7 | 0001 00 s |
| 0/4 | 8 | 0000 110 s |
| 2/2 | 8 | 0000 100 s |
| 8/1 | 8 | 0000 111 s |
| 9/1 | 8 | 0000 101 s |
| 84 ESCAPE | 6 | 0000 01 |
| 0/5 | 9 | 0010 0110 s |
| 0/6 | 9 | 0010 0001 s |
| 1/3 | 9 | 0010 0101 s |
| 3/2 | 9 | 0010 0100 s |
| 10/1 | 9 | 0010 0111 s |
| 11/1 | 9 | 0010 0011 s |
| 12/1 | 9 | 0010 0010 s |
| 13/1 | 9 | 0010 0000 s |
| 0/7 | 11 | 0000 0010 10 s |
| 1/4 | 11 | 0000 0011 00 s |
| 2/3 | 11 | 0000 0010 11 s |
| 4/2 | 11 | 0000 0011 11 s |
| 5/2 | 11 | 0000 0010 01 s |
| 14/1 | 11 | 0000 0011 10 s |
| 15/1 | 11 | 0000 0011 01 s |
| 16/1 | 11 | 0000 0010 00 s |
| 0/8 | 13 | 0000 0001 1101 s |
| 0/9 | 13 | 0000 0001 1000 s |
| 0/10 | 13 | 0000 0001 0011 s |
| 0/11 | 13 | 0000 0001 0000 s |

Fig. 8B 81 82 83

| R/L | LENGTH | CODEWORD |
|---|---|---|
| 1/5 | 13 | 0000 0001 1011 s |
| 2/4 | 13 | 0000 0001 0100 s |
| 3/3 | 13 | 0000 0001 1100 s |
| 4/3 | 13 | 0000 0001 0010 s |
| 6/2 | 13 | 0000 0001 1110 s |
| 7/2 | 13 | 0000 0001 0101 s |
| 8/2 | 13 | 0000 0001 0001 s |
| 17/1 | 13 | 0000 0001 1111 s |
| 18/1 | 13 | 0000 0001 1010 s |
| 19/1 | 13 | 0000 0001 1001 s |
| 20/1 | 13 | 0000 0001 0111 s |
| 21/1 | 13 | 0000 0001 0110 s |
| 0/12 | 14 | 0000 0000 1101 0 s |
| 0/13 | 14 | 0000 0000 1100 1 s |
| 0/14 | 14 | 0000 0000 1100 0 s |
| 0/15 | 14 | 0000 0000 1011 1 s |
| 1/6 | 14 | 0000 0000 1011 0 s |
| 1/7 | 14 | 0000 0000 1010 1 s |
| 2/5 | 14 | 0000 0000 1010 0 s |
| 3/4 | 14 | 0000 0000 1001 1 s |
| 5/3 | 14 | 0000 0000 1001 0 s |
| 9/2 | 14 | 0000 0000 1000 1 s |
| 10/2 | 14 | 0000 0000 1000 0 s |
| 22/1 | 14 | 0000 0000 1111 1 s |
| 23/1 | 14 | 0000 0000 1111 0 s |
| 24/1 | 14 | 0000 0000 1110 1 s |
| 25/1 | 14 | 0000 0000 1110 0 s |
| 26/1 | 14 | 0000 0000 1101 1 s |
| 0/16 | 15 | 0000 0000 0111 11 s |
| 0/17 | 15 | 0000 0000 0111 10 s |
| 0/18 | 15 | 0000 0000 0111 01 s |
| 0/19 | 15 | 0000 0000 0111 00 s |
| 0/20 | 15 | 0000 0000 0110 11 s |
| 0/21 | 15 | 0000 0000 0110 10 s |
| 0/22 | 15 | 0000 0000 0110 01 s |
| 0/23 | 15 | 0000 0000 0110 00 s |
| 0/24 | 15 | 0000 0000 0101 11 s |
| 0/25 | 15 | 0000 0000 0101 10 s |

Fig. 8C

| R/L (81) | LENGTH (82) | CODEWORD (83) |
|---|---|---|
| 0/26 | 15 | 0000 0000 0101 01s |
| 0/27 | 15 | 0000 0001 0101 00s |
| 0/28 | 15 | 0000 0001 0100 11s |
| 0/29 | 15 | 0000 0001 0100 10s |
| 0/30 | 15 | 0000 0001 0100 01s |
| 0/31 | 15 | 0000 0001 0100 00s |
| 0/32 | 16 | 0000 0001 0011 000s |
| 0/33 | 16 | 0000 0001 0010 111s |
| 0/34 | 16 | 0000 0001 0010 110s |
| 0/35 | 16 | 0000 0001 0010 101s |
| 0/36 | 16 | 0000 0001 0010 100s |
| 0/37 | 16 | 0000 0001 0010 011s |
| 0/38 | 16 | 0000 0000 0010 010s |
| 0/39 | 16 | 0000 0000 0010 001s |
| 0/40 | 16 | 0000 0000 0010 000s |
| 1/8 | 16 | 0000 0000 0011 111s |
| 1/9 | 16 | 0000 0000 0011 110s |
| 1/10 | 16 | 0000 0000 0011 101s |
| 1/11 | 16 | 0000 0000 0011 100s |
| 1/12 | 16 | 0000 0000 0011 011s |
| 1/13 | 16 | 0000 0000 0011 010s |
| 1/14 | 16 | 0000 0000 0011 001s |
| 1/15 | 17 | 0000 0000 0001 0011s |
| 1/16 | 17 | 0000 0000 0001 0010s |
| 1/17 | 17 | 0000 0000 0001 0001s |
| 1/18 | 17 | 0000 0000 0001 0000s |
| 6/3 | 17 | 0000 0000 0001 0100s |
| 11/2 | 17 | 0000 0000 0001 1010s |
| 12/2 | 17 | 0000 0000 0001 1001s |
| 13/2 | 17 | 0000 0000 0001 1000s |
| 14/2 | 17 | 0000 0000 0001 0111s |
| 15/2 | 17 | 0000 0000 0001 0110s |
| 16/2 | 17 | 0000 0000 0001 0101s |
| 27/1 | 17 | 0000 0000 0001 1111s |
| 28/1 | 17 | 0000 0000 0001 1110s |
| 29/1 | 17 | 0000 0000 0001 1101s |
| 30/1 | 17 | 0000 0000 0001 1100s |
| 31/1 | 17 | 0000 0000 0001 1011s |

Fig. 8D 86 88 85

| R(RUN) | ESCAPE(FIXED LENGTH CODE) |
|---|---|
| 0 | 0000 00 |
| 1 | 0000 01 |
| 2 | 0000 10 |
| 3 | 0000 11 |
| 4 | 0001 00 |
| ⋮ | ⋮ |
| 59 | 1110 11 |
| 60 | 1111 00 |
| 61 | 1111 01 |
| 62 | 1111 10 |
| 63 | 1111 11 |

85 87 89

| L(LEVEL) | ESCAPE(FIXED LENGTH CODE |
|---|---|
| -2047 | 1000 0000 0001 |
| -2046 | 1000 0000 0010 |
| ⋮ | ⋮ |
| -2 | |
| -1 | 1111 1111 1110 |
| INHIBIT | 1111 1111 1111 |
| 1 | 0000 0000 0000 |
| 2 | 0000 0000 0001 |
| | 0000 0000 0010 |
| ⋮ | ⋮ |
| 2046 | 0111 1111 1110 |
| 2047 | 0111 1111 1111 |

SCRAMBLING TYPE METHOD AND APPARATUS FOR VIDEO TRANSMISSION/ RECEIPT

BACKGROUND OF THE INVENTION

The present invention relates to a scrambling type video transmitting/receiving method and an apparatus therefore.

A conventional signal processing system for digital television (TV) broadcasting has a video transmitter and a video receiver. The video transmitter has a Codec (Coder-Decoder) (compression) including a scan conversion circuit. An original video signal or picture input to the Codec is subjected to scan conversion by the scan conversion circuit, subjected to DCT (Discrete Cosine Transform) by a DCT circuit, quantized by a quantizing circuit, controlled by a QSC circuit as to the amount of code, and then subjected to variable-length coding by a VLC (Variable-Length Coding) circuit. The resulting compressed video signal is scrambled by a scrambling circuit. An ECC (Error Correcting Code) is added to the scrambled video signal by an ECC adding circuit. The scrambled video with the ECC is modulated by a modulating circuit to turn out a signal to be transmitted.

The video receiver includes a demodulating circuit for demodulating the signal received from the video transmitter. The demodulated signal is subjected to ECC processing by an ECC processing circuit and then correctly descrambled by a descrambling circuit to turn out a descrambled compressed video signal. The descrambled compressed video signal is subjected to variable-length decoding by a VLD circuit included in a Codec (expansion), dequantized by a dequanting circuit, subjected to IDCT (Inverse DCT) by an IDCT circuit, and then subjected to inverse scan conversion by an inverse scan converting circuit, whereby a picture is reproduced.

Various methods for scrambling the compressed video signal have been proposed in the past in relation to the Codec (compression). The simplest method is to generate random data by use of a particular generator polynomial and add the random data to video/audio data to be transmitted by use of modulo 2 addition. For example, assume a generator polynomial:

$$g(X)=X^{15}+X+1 \quad \text{Eq. (1)}$$

Then, random data are produced from preset data which are all “1”.

Each subscriber is provided with the descrambling circuit of the Codec (expansion) based on the above Eq. (1) and is allowed to obtain correct video/audio data. Persons other than subscribers are unable to see the Eq. (1) and obtain only the scrambled meaningless data. Scrambling meaningless data will be referred to as scrambling hardy or “fully (or strongly) scrambling” hereinafter. In this sense, the conventional scrambling circuit scrambles the compressed image data hard (fully or strongly).

Technologies relating to the present invention are taught in, e.g., Japanese Patent Laid-Open Publication No. 7-111647 (document 1 hereinafter). Document 1 relates to a scrambler constructed to allow only a limited person to reproduce video data, i.e., a signal processing device capable of executing scrambling and descrambling which controls the appearance of a picture in accordance with a desired purpose. Document 1 uses an original signal in the form of a video signal based on MPEG (Motion Picture Expert Group) standards. A code detector reads the individual code, detects a “det type” signal, and delivers the detected signal to a random number generator. The random number generator generates random numbers on the basis of a scramble key. An Ex-OR (Exclusive OR) gate produces an Ex-OR of a signal output from the random number generator and the original signal, thereby outputting a scrambled signal. The reproducing side performs the above processing in the inverse order with the same configuration. With this construction, it is possible to achieve not only control over the scrambling effect, but also a desired special effect.

Japanese Patent Laid-Open Publication No. 7-67096 (document 2 hereinafter) pertains to a scrambler constructed to protect a reproducing unit from malfunction ascribable to the coincidence of scrambled data with a reservation word, thereby limiting a person expected to reproduce video data. A code detector reads an input signal as to image data based on the MPEG standard, selects a part of the signal which will not coincide with a reservation word as a signal to be scrambled, and then delivers a scramble command to a random number generator. The random number generator generates random numbers only when it receives the scramble command from the code detector, and produces an Ex-OR. The reproducing side performs the above procedure in the inverse order.

Further, Japanese Patent Laid-Open Publication No. 4-8029 (document 3 hereinafter) proposes an enciphering coder capable of enciphering only the initial value of a coding system by use of an encipher key and sending the enciphered value. Document 3 contemplates to enhance secrecy, to lower the processing speed of an enciphering section, to scale down hardware, and to reduce the cost. In document 3, data compressing means is implemented as a compressor for compressing an eight-bit digital signal to a four-bit code. A signal converted by signal converting means is compressed by a coding system and then sent. Enciphering means enciphers only the initial value by using a sixty-four-bit key agreed beforehand only between a transmitting person and a receiving person. In the case of TV, the Initial value is given every scanning line or every segment of a single scanning line, so that enciphering only the initial value ensures secrecy.

Moreover, Japanese Patent Laid-Open Publication No. 5-145923 (document 4 hereinafter) teaches a replaceable secrecy protection module. In document 4, a program signal is scrambled by a key. The key is enciphered twice and then multiplexed with the scrambled program signal. A decoder performs first key decoding by using a signal sequence stored therein and assigned to second secrecy. Then, the replaceable secrecy protection module performs decoding by using a number sequence stored therein and assigned to first secrecy. Subsequently, the decoder descrambles the program by using a twice decoded key.

As stated above, the conventional scrambling methods each scramble a video signal hard (fully or strongly), so that the resulting data are entirely meaningless for persons other than subscribers. However, it has been reported that data allowing an unauthorized person to recognize at least the outline of a picture, as distinguished from the entirely meaningless random data, encourage the person to make subscription with the intention of enjoying complete video and/or audio data. In fact, as for analog broadcasting, WOWOW (one of Japanese broadcasting stations) is broadcasting video whose outlines can be barely recognized by unauthorized persons and has successfully increased the number of subscribers.

Documents 1 and 2 each scrambles data by use of a random number generator and therefore outputs entirely meaningless scrambled data like the traditional scrambling method. Document 3 enciphers only the initial value of coded data by using an encipher key and differs from the scrambling technology. Document 4 pertains to the scrambling of a program signal by use of a key and entirely differs from the present invention as to the kind of data to be scrambled.

SUMMARY OF THE INVENTION

It is therefore an object of the present invention to provide a scrambling type video transmitting/receiving method feasible for digital TV broadcasting and urging unauthorized persons to enjoy complete video/audio data by making subscription.

In accordance with the present invention, in a method of transmitting/receiving a video produced by compressing an original video signal in the form of a compressed video signal, soft scrambling is executed with the compressed image signal in order to transmit the resulting scrambled signal as a signal to be transmitted.

Also, in accordance with the present invention, in a method of transmitting/receiving a compressed video signal produced by compressing an original video signal, soft scrambling is effected with the original video signal before compression.

Further, in accordance with the present invention, in a method of transmitting/receiving a compressed video signal produced by compressing an original video signal, main soft scrambling is effected with the original video signal before compression, and then auxiliary soft scrambling is effected with the compressed video signal to thereby send the resulting signal as a signal to be transmitted.

Furthermore, in accordance with the present invention, a video transmitter/receiver has a compressing circuit for compressing an original video signal to thereby output a compressed video signal, and a scrambling circuit for executing soft scrambling with the compressed video signal and sending the resulting signal as a signal to be transmitted.

Moreover, in accordance with the present invention, a video transmitter/receiver has a scrambling circuit for executing soft scrambling with an original video signal to thereby output a scrambled signal, and a compressing circuit for compressing the scrambled signal to thereby output a compressed video signal. The compressed video signal is sent as a signal to be transmitted.

In addition, in accordance with the present invention, a video transmitter/receiver includes a main scrambling circuit for executing main soft scrambling with an original video signal to thereby output a main scrambled signal. A compressing circuit compresses the main scrambled signal to thereby output a compressed video signal. An auxiliary scrambling circuit executes auxiliary soft scrambling with the compressed video signal to thereby output an auxiliary scrambled signal. The auxiliary scrambled signal is sent as a signal to be transmitted

BRIEF DESCRIPTION OF THE DRAWINGS

The above and other objects, features and advantages of the present invention will become apparent from the following detailed description taken with the accompanying drawings in which:

FIG. 5 shows matrix data produced by bidimensional DCT and quantization effected in the video receiver of FIG. 2;

FIG. 6 shows matrix data before which will appear before dequantization if the video receiver lacks a descrambling circuit;

FIG. 7 shows a table (DC components) prescribed by MPEG2;

FIG. 8 shows a VLC table (AC components) also prescribed by MPEG2;

DESCRIPTION OF THE PREFERRED EMBODIMENTS

Figure 1:
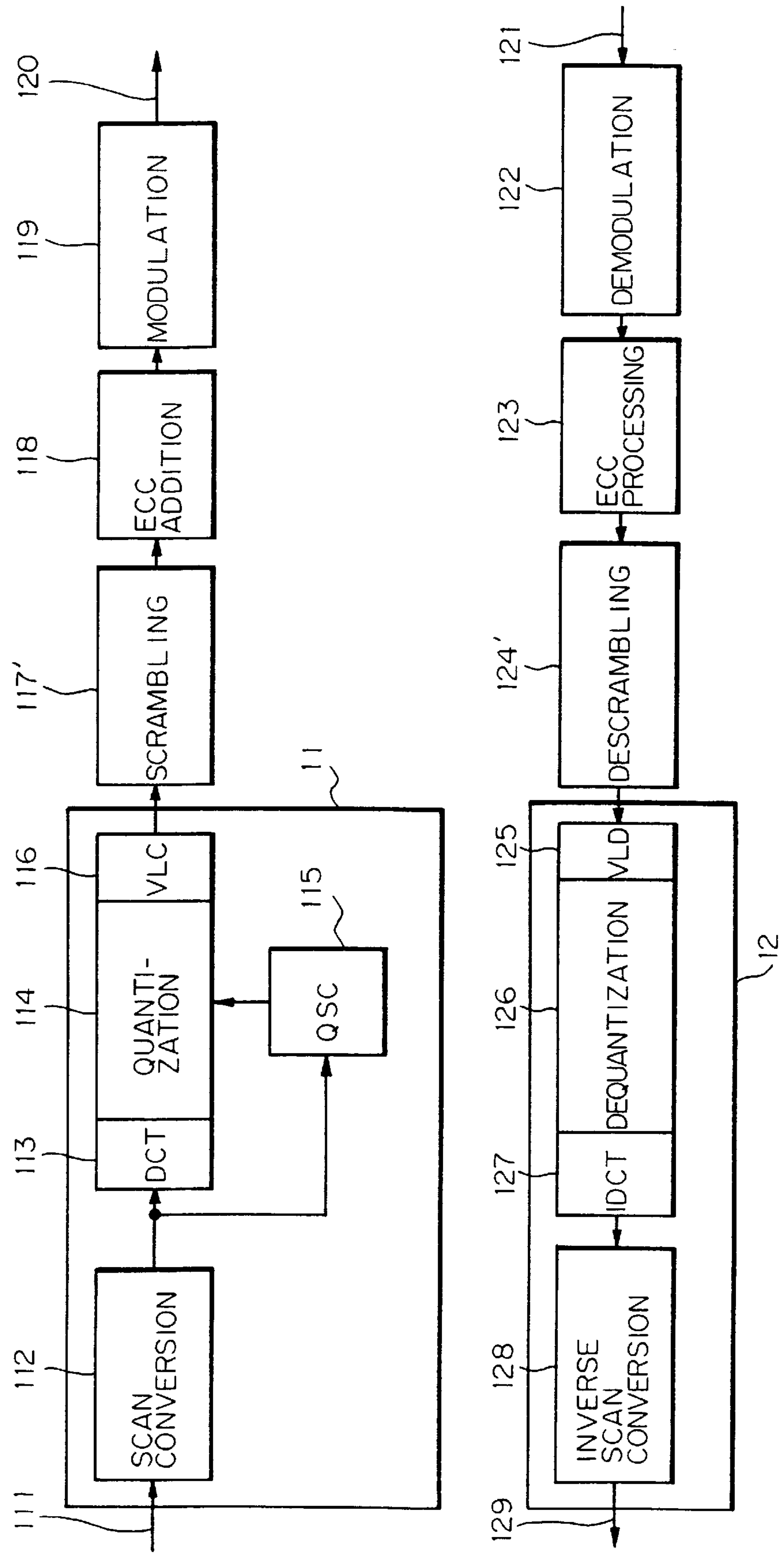
FIG. 1 is a block diagram schematically showing a video transmitter and a video receiver representative of a conventional signal processing system for digital TV broadcasting.

To better understand the present invention, brief reference will be made to a video transmitter and a video receiver included in a conventional signal processing system for digital TV broadcasting, shown in FIG. 1. As shown, the video transmitter is made up of a Codec (compression) 11, a scrambling 117', an ECC addition 118, and a modulation 119. The Codec block 11 has a scan conversion 112, a DCT 113, a quantization 114, a QSC 115, and VLC 116. An original video signal or 111 input to the Codec 11 is subjected to scan conversion by the scan conversion 112, subjected to DCT by the DCT 113, quantized by the quantization 114, controlled by the QSC 11 as to the amount of code, and then subjected to variable-length coding by the VLC 116. The resulting compressed video signal is scrambled by the scrambling 117'. An ECC is added to the scrambled video signal by the ECC addition 118. The scrambled video with the ECC is modulated by the modulation 119 to turn out a signal 120 to be transmitted.

The video receiver is made up of a demodulation 122, an ECC processing 123, a descrambling 124', and a Codec (expansion) 12. The Codec 12 has a VLD 125, a dequantization 126, a IDCT 127, and an inverse scan conversion 128. A received signal 121 is demodulated by the demodulation 122, subjected to ECC processing by the ECC processing 123, and then correctly descrambled by the descrambling 124' to turn out a descrambled compressed video signal. Correct descrambling can be done only by a subscriber having a scramble decoder. The descrambled compressed video signal is subjected to variable-length decoding by the VLD 125, dequantized by the dequantization 126, subjected to IDCT by the IDCT 127, and then subjected to inverse scan conversion by the inverse scan conversion 128. As a result, a picture 129 is reproduced.

In each of the video transmitter and video receiver, the scrambling block and ECC block, i.e., the scrambling 117' and ECC addition 118 or the descrambling 124' ad ECC processing 123 are replaceable with each other.

The conventional scrambling method scrambles a video signal hard (fully or strongly), so that the resulting data are entirely meaningless for persons other than subscribers. However, it has been reported that data allowing a person to recognize a video to a certain degree, as distinguished from the entirely meaningless random data, encourages the person to make subscription for enjoining a complete video/audio, as stated earlier.

Figure 2:
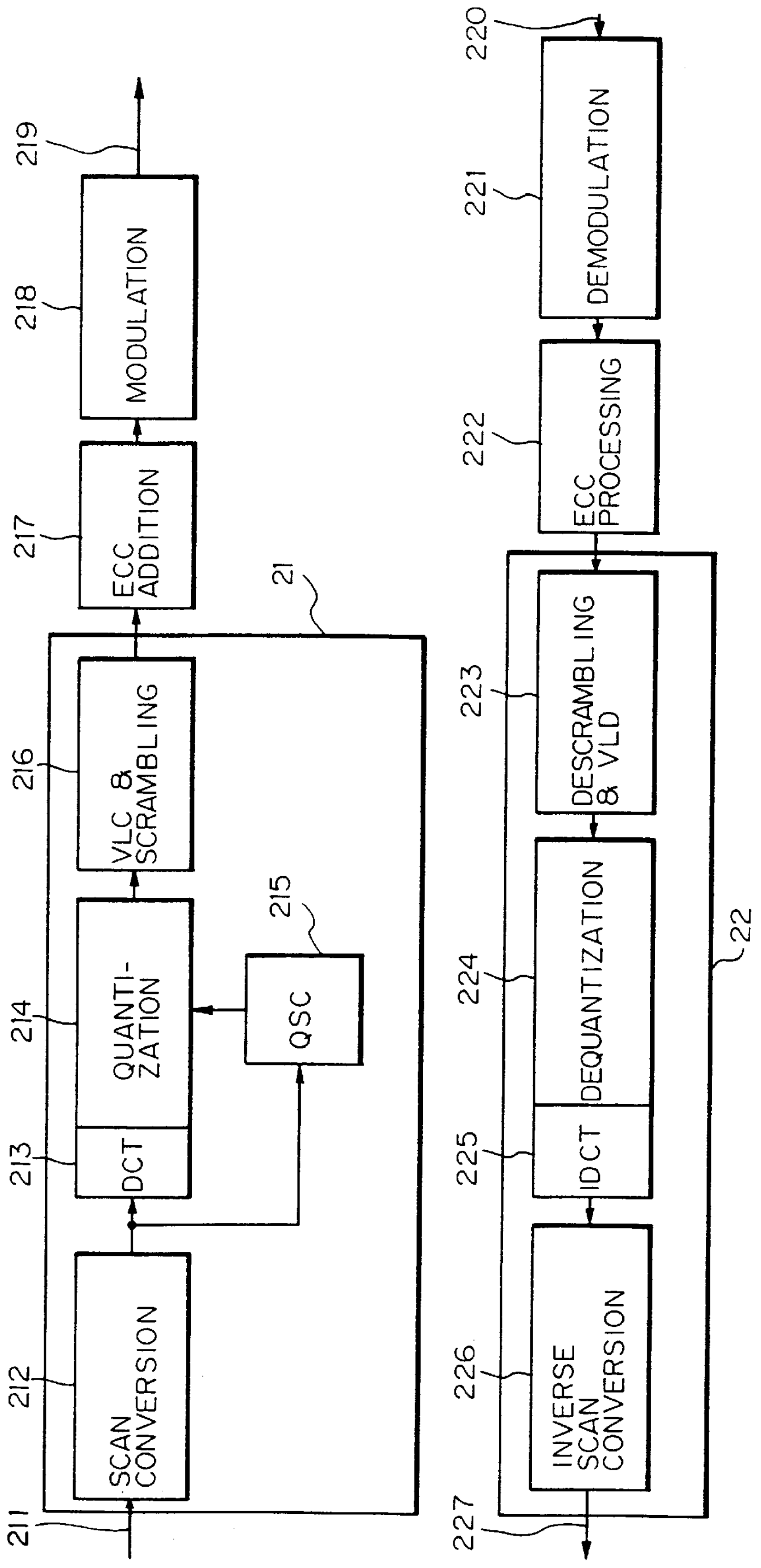
FIG. 2 is a block diagram schematically showing a video transmitter and a video receiver embodying the present invention.

Referring to FIG. 2, a video transmitter and a video receiver embodying the present invention will be described. As shown, the video transmitter is made up of a Codec (compression) 21, an ECC addition 217, and a modulation 218. The Codec 21 has a scan conversion 212, a DCT 213, a quantization 214, a QSC 215, and a VLC and scrambling 216.

The Codec 21 executes orthogonal transform, quantization and variable-length coding with an original video signal or picture 211 and thereby compresses video data. Typical of orthogonal transform is (motion compensated) DCT while typical of a compression format is a MPEG2 format. The original video signal 211 is subjected to scan conversion by the scan conversion 212, subjected to DCT by the DCT 213, quantized by the quantization 214, and then controlled by the QSC 215 as to the a-mount of code. Subsequently, the video data are scrambled by the VLC and scrambling 216 at the time of selection of a VLC table (not shown). The ECC addition 217 adds an ECC to the scrambled video data output from the Codec 21. The modulation 218 executes OFDM or similar modulation particular to digital broadcasting, thereby outputting video data 219 to be transmitted.

The video receiver is made up of a demodulation 221, an ECC processing 222, and a Codec (expansion) 22. The Codec 22 has a descrambling and VLD 223, a dequantization 224, an IDCT 225, and an inverse scan conversion 226. The demodulation 221 demodulates a received signal 220 by, e.g., the OFDM scheme. The ECC processing 222 executes code error correction with the output of the demodulation 221. The Codec 22 expands the output of the ECC processing 222. If the subscriber has a scramble decoder, the descrambling and VLD 223 subjects the expanded data to variable-length decoding by use of a correct table. The dequantization 224 dequantizes the decoded data output from the descrambling and VLD 223. The IDCT 225 executes IDCT with the dequantized data output from the dequantization 224. Further, the inverse scan conversion 226 performs inverse scan conversion with the output of the IDCT 225 and thereby reproduces a complete picture 227. As for a person not hang a scramble decoder, the descrambling and VLD 223 decodes low frequency components with a correct table, but decodes high frequency components with an incorrect table. As a result, the picture 227 represented by the data routed through the dequantization 224, IDCT 225 and inverse scan conversion 226 is incomplete.

Figure 3:
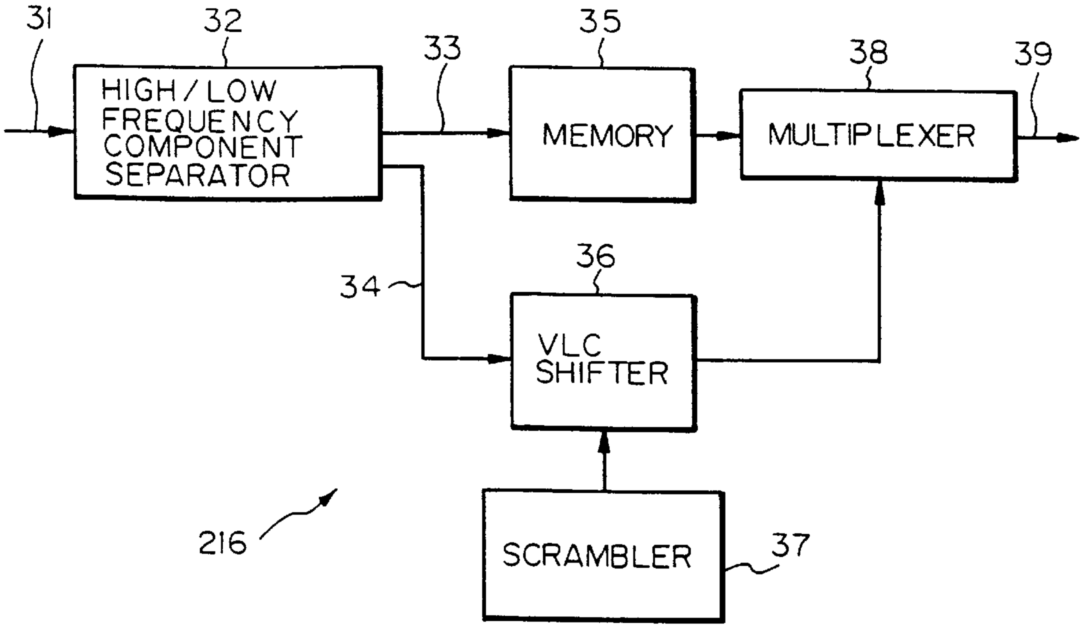
FIG. 3 is a block diagram schematically showing a specific configuration of a VLC and scrambling circuit included in the video transmitter of FIG. 2.

FIG. 3 shows a specific configuration of the VLC and scrambling 216. As shown, the VLC and scrambling 216 has a high/low frequency component separator 32, a memory 35 for timing adjustment, a VLC shifter 36, a scrambler 37, and a multiplexer 38. In operation, the high/low frequency component separator 32 separates video data 31 undergone orthogonal transform and quantization into low frequency components 33 and high frequency components 34. The VLC shifter 36 assigns other table data having the same number of bits to the high frequency components 34. Which table data should be assigned depends on the output data of the scrambler 37. Wide the above processing with the high frequency components is under way, the low frequency components 33 are delayed by the memory 35. The low frequency components delayed by the memory 35 and the scrambled high frequency components output from the VLC shifter 36 are combined by the multiplexer 38. The output of the multiplexer 38 is applied to the ECC 217 (FIG. 2) as the output signal 39 of die VLC and scrambling 39.

Figure 4:
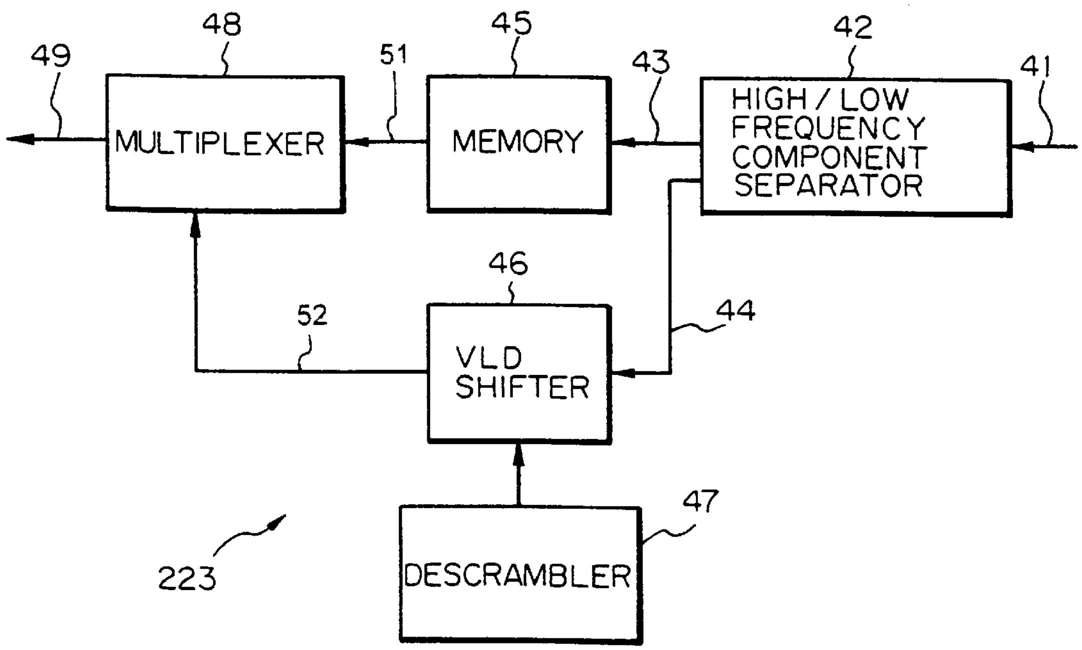
FIG. 4 is a schematic block diagram showing a specific configuration of a descrambling and VLD circuit included in the video receiver of FIG. 2.

FIG. 4 shows a specific configuration of the descrambling and VLD 223. As shown, the descrambling and VLD 223 has a high/low frequency component separator 42, a memory 45 for timing adjustment, a VLD shifter 46, a descrambler 47, and a multiplexer 48. In operation, the high/flow frequency component separator 42 separates video data 41 input from the ECC processing 222 (FIG. 2) into low frequency components 43 and high frequency components 44. The VLD shifter 46 transforms the high frequency components 44 to the unscrambled table data having the same number of bits and thereby subjects them to variable-length decoding. Which table data should be assigned is dependent on the output data of the descrambler 47. While the above processing with the high frequency components 44 is under way, the low frequency components 43 are delayed by the memory 45. The low frequency components, labeled 51, delayed by the memory 45 and the descrambled high frequency components 52 output from the VLD shifter 46 are combined by the multiplexer 48. The output of the multiplexer 48 is fed to the dequantization 224 as the output signal 49 of the descrambling and VLD 223.

The operation of the transmitter will be described more specifically. Assume that orthogonal transform is implemented as bidimensional DCT using a four-pixel, four-line matrix as a single block. FIG. 5 shows matrix data 31 transformed by bidimensional DCT and then quantized. When the data shown in FIG. 5 are zigzag scanned, they are output in the order of 15, −2, 0, 0, 0, −1, 0, 0, −3, 0, 0, 2, 0, 1, 0 and 0. These data are subjected to variable-length coding using Huffman codes to turn out, in terms of run/level, DC=15, run=0/level=−2, run=3/level=−1, run=2/level=−3, run=2/level=2, run=1/level=1, and EOB (End of Block). These runs/levels are used as a luminance signal and coded by use of, e.g., MPEG2 format variable-length coding tables. FIGS. 7 and 8 respectively show MPEG2 format variable-length coding tables assigned to DC components and AC components.

In FIG. 7, assume that a code to be sent consists of a codeword 71 and additional bits 72.

In FIG. 8, "R/L" 81 shows the combinations of 0 run/level while "Length" 82 shows the bit lengths of codewords. "Codeword" 83 shows data to be sent. "Escape" 84 shows data to be sent, but unable to be represented by the table. This kind of data is listed in subtables 85; "R" 86 and "L" respectively show 0 run and level, and data to be sent consists of 88 and 89. Also shown in FIG. 8 are "Note 1: The last bit s is representative of "+" when it is "0" or representative of "−" when it is "1", "Note 2: Code used with the first coefficient overlaps EOB." and "Note 3: Code used for the second and successive rounds". The tables shown in FIGS. 7 and 8 are transferred from "ISO/IEC 13818".

By using the above tables, the following results of coding are sequentially produced:

1101 111, 0100 1,
0011 11, 0000 0010 111,
0000 1000, 0110, 10

Subsequently, the high frequency components are scrambled, but the low frequency components are not scrambled. Assume that DC and run/level are directly sent in pair and then scrambled. Specifically, the following DC and run/level pair is sent first:

1101 111, 0100 1

Then, the above pair is scrambled. At this instant, random data produced by a generator polynomial using a key are divided on a five bit basis so as to output random data of 0–31. Assume that the following random data are produced by the generator polynomial:

00010, 10010, 00110, 00011

By dividing the above random data on a five bit basis, there are produced:

2, 18, 6, 3

First, "001111" whose run and level are 3 and −1, respectively, is scrambled. "0011 11" has six bits. The outputs or patterns each having six bits are, in addition to "0011 11", "0010 10 " (run=0/level=3)", "0010 11 (run=0/level=−3)", "0011 10 (run=3/level=1)", 0011 11 (run=3/level=−1)", "0011 00 (run=4/level=1)", and "001101" (run=4/level=−1)", i.e., six patterns in total. It is to be noted that the above underlined pattern is the run=3/level=−1 pattern.

Because 2 is the first random data for scrambling, the above patterns are arranged in the order shown in FIG. 8. Then, the data "0011 01" next to the "0011 11" is selected and sent.

Next, "0000 0010 111" whose run and level are 2 and −3, respectively, is scrambled. This data has eleven bits. The outputs or patterns each having eleven bits are in addition to "0000 0010 111", "0000 0010 100", "0000 0010 101", "0000 0011 000", "0000 0011 001", "0000 0010 110", "0000 0010 111", 0000 0011 110", "0000 0011 111", "0000 0010 010", "0000 0010 011", "0000 0011 100", "0000 0011 101", "0000 0011 010", 0000 0011 011", "0000 0010 000", and "0000 0010 001", i.e., sixteen patterns in total.

Because 18 is the second randon data for scrambling, the above patterns are arranged in the order shown in FIG. 8. Then, the data "0000 0011 111" which is the eighteenth data from "0000 0010 111" is selected and sent. The last pattern "0000 0010 001" is followed by the first pattern "0000 0010 100".

Subsequently, "0000 1000" whose run and level both are 2 is scrambled. Because 6 is the third random data for scrambling, the associated patterns are arranged in the order shown in FIG. 8. As a result, "0000 1100" which is the sixth data from "0000 1000" is sent.

Thereafter, "0110" whose run and level both are 1 are scrambled. Because 3 is the fourth random data for scrambling, the associated patterns are arranged in the order shown in FIG. 8. As a result, "0111" which is the third data from "0110" is sent.

Finally, EOB is sent, as follows:

0011 01, 0000 0011 111, 0000 1100, 0111, 10

The entire data sent are therefore as follows:

1101 111, 0100 1,
0011 01, 0000 0011 111,
0000 1100, 0111, 10

These are the data 39 output from the VLC and scrambling 216.

The operation of the video receiver is as follows. The data 41 input to the descrambling and VLD 223 are identical with the data 39 output from the VLC and scrambling 216. As for the subscriber knowing the key, the receiver performs an operation inverse to the operation of the transmitter. As a result, the descrambling and VLD circuit 223 outputs the following data 49;

1101 111, 0100 1,
0011 11, 0000 0010 111,
0000 1000, 0110, 10

From the above data, the data shown in FIG. 5 can be fully reconstructed, as follows:

DE=15, run=0/level=2, run 3/level=−1,
run=2/level=−3, run=2/level=2, run=1/level=1 EOB.

By contrast, for an unauthorized person, the descrambling and VLD 223 decodes the input data 41 as they are, as follows;

1101 111, 0100, 1,
0011 01, 0000 0011 111,
0000 1100, 0111, 10

Specifically, when the above variable-length data are subjected to variable-length coding in accordance with the tables of FIGS. 7 and 8, the descrambling and VLD 223 outputs the data 49, as follows:

DC=15, run=0/level=−2, run=4/level=−1,
run 4/level=−2, run=0/level=4, run=1/level=−1 EOB.

The resulting data arm shown in FIG. 6 and subjected to dequantization and bidimensional DCT. Because high frequency components shown in FIG, 6 are not correct, a picture represented by the resulting video signal does not allow the unauthorized person to see its details although showing its outline.

Figure 9:
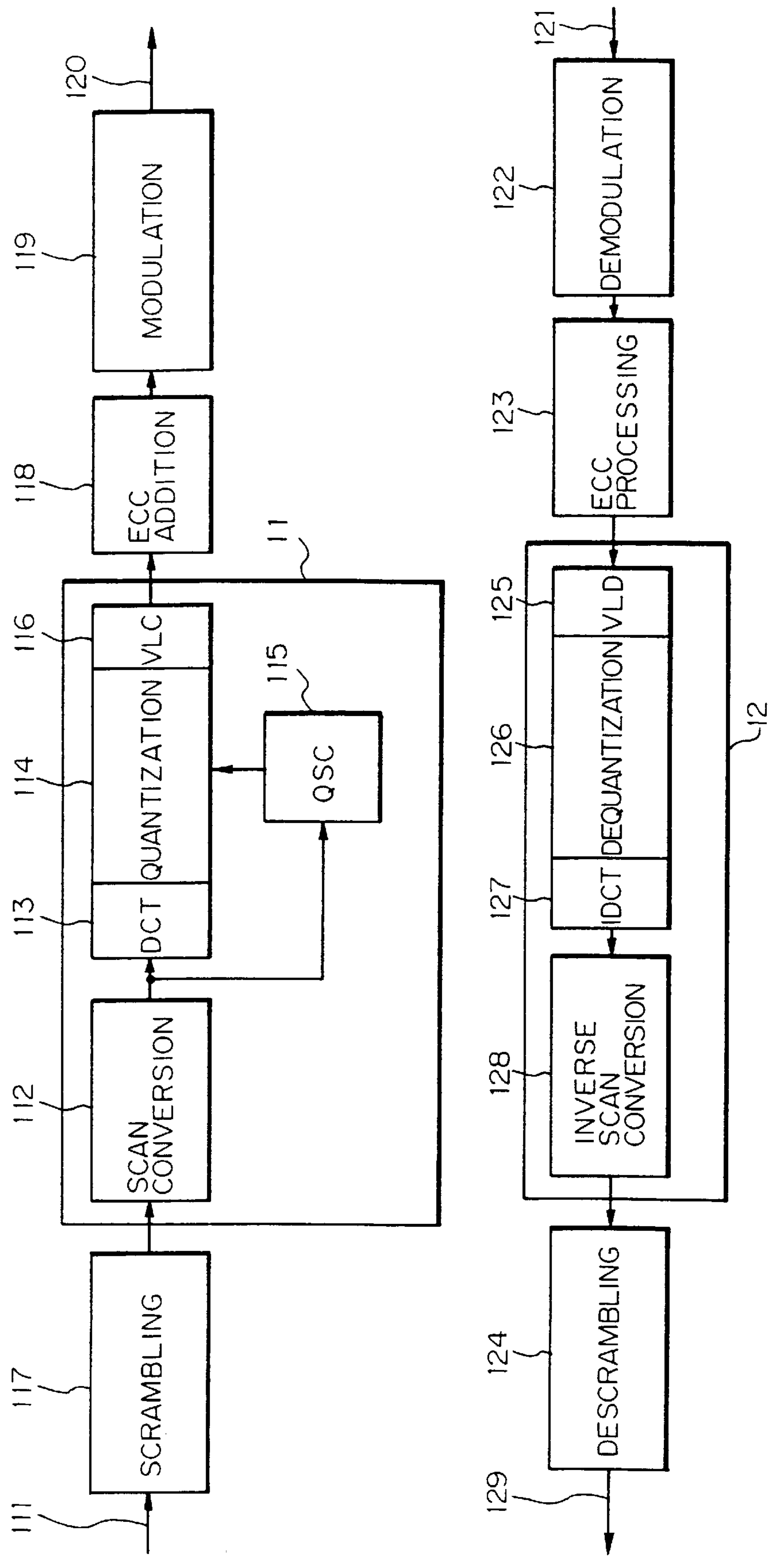
FIGS. 9–11 are block diagrams each showing an alternative embodiment of the present invention.

Referring to FIG. 9, an alternative embodiment of the present invention is shown. As shown, this embodiment differs from the previous embodiment in that the scrambling 117 precedes the Codec 11, and in that the descrambling 124 follows the Codec 12. In this embodiment, the scrambling 117 receives a wide signal compressed by the MPEG2 format and rearranges the picture data of each group of pictures in a particular order according to scrambling. The descrambling 124 restores the original order of the picture data of each group of pictures.

Assume that a single picture group has fifteen pictures, and that the scrambled outputs are divided on a four bit basis and dealt with as the order of pictures. Further, assume that the following divided four-bit scrambled outputs sequentially appear:

3, 11, 8, 15, 0, 14, 8, 2, . . .

Then, pictures are sent in the order of 2, 11, 8 and so forth. Because only pictures 0–14 of the fifteen pictures of each group of pictures are valid, the fourth picture 15 is skipped, and in addition the second appearance of the seventh picture 8 before the completion of all the pictures is skipped.

The pictures may be sent in the order of scrambling. Alternatively, the order of one round of the scrambled outputs may be stored and repeatedly used thereafter.

The receiver can reproduce the above pictures in the original order by decoding them with a scramble decoder, i.e., the descrambling 124. Should the pictures be decoded without the scramble decoder, it would be reduced in the rearranged order of frames and would therefore be difficult to see.

Figure 10:
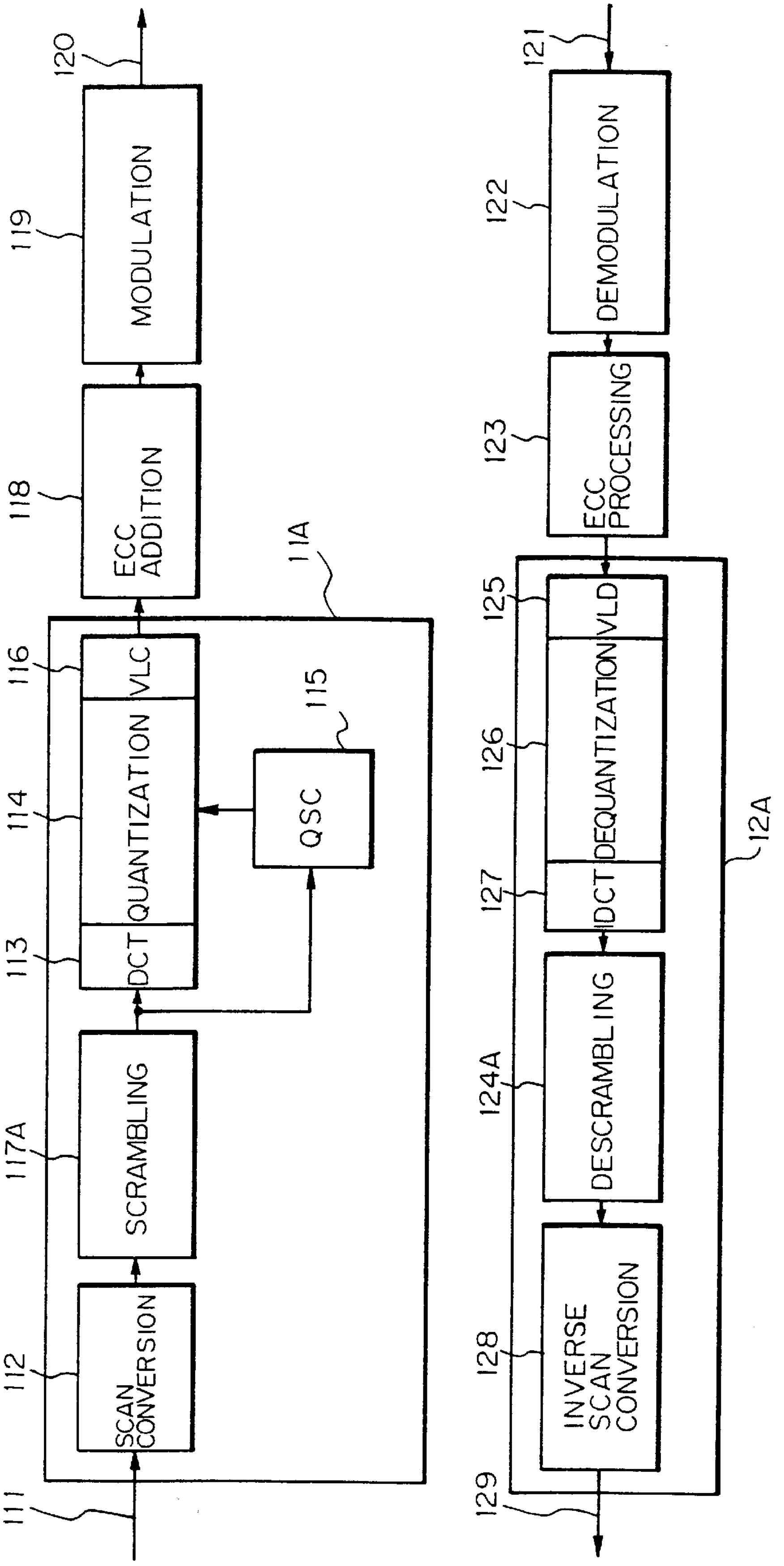

Another alternative embodiment of the present invention will be described with reference to FIG. 10. As shown, this embodiment differs from the embodiment of FIG. 1 in that a scrambling 117A is included in a Codec (compression) 11A and follows the scan conversion 112, and in that a descrambling 124A is included in a Codec (expansion) 12A and precedes the inverse scan conversion 128. The scrambling 117A receives a video signal compressed in the MPEG2 format and rearranges slice data within a picture in a particular order according to scrambling. The descrambling 124A restores the original order of the slice data.

Assume that a picture has thirty slices, and that the scrambled outputs are divided on a four bit basis and dealt with as the order of pictures. Further assume that the following divided four-bit scrambled outputs sequentially appear:

16, 5, 31, 21, 12, 27, 7, 16, . . .

Then, pictures a sent in the order of 16, 5 and so forth. Because only pictures 0–29 of the thirty slices are valid, the third 31 is skipped, and in addition the second appearance of the eighth 16 before the completion of the picture is skipped.

The slices may be sent in the order of scrambling. Alternatively, the order of one round of the scrambled outputs may be stored and repeatedly used thereafter.

The receiver can reproduce the above picture in the original order by decoding them with a scramble decoder, i.e., the descrambling 124A. Should the picture be decoded without the scramble decoder, it would be reproduced in the rearranged order of slices and would therefore be difficult to see.

Figure 11:
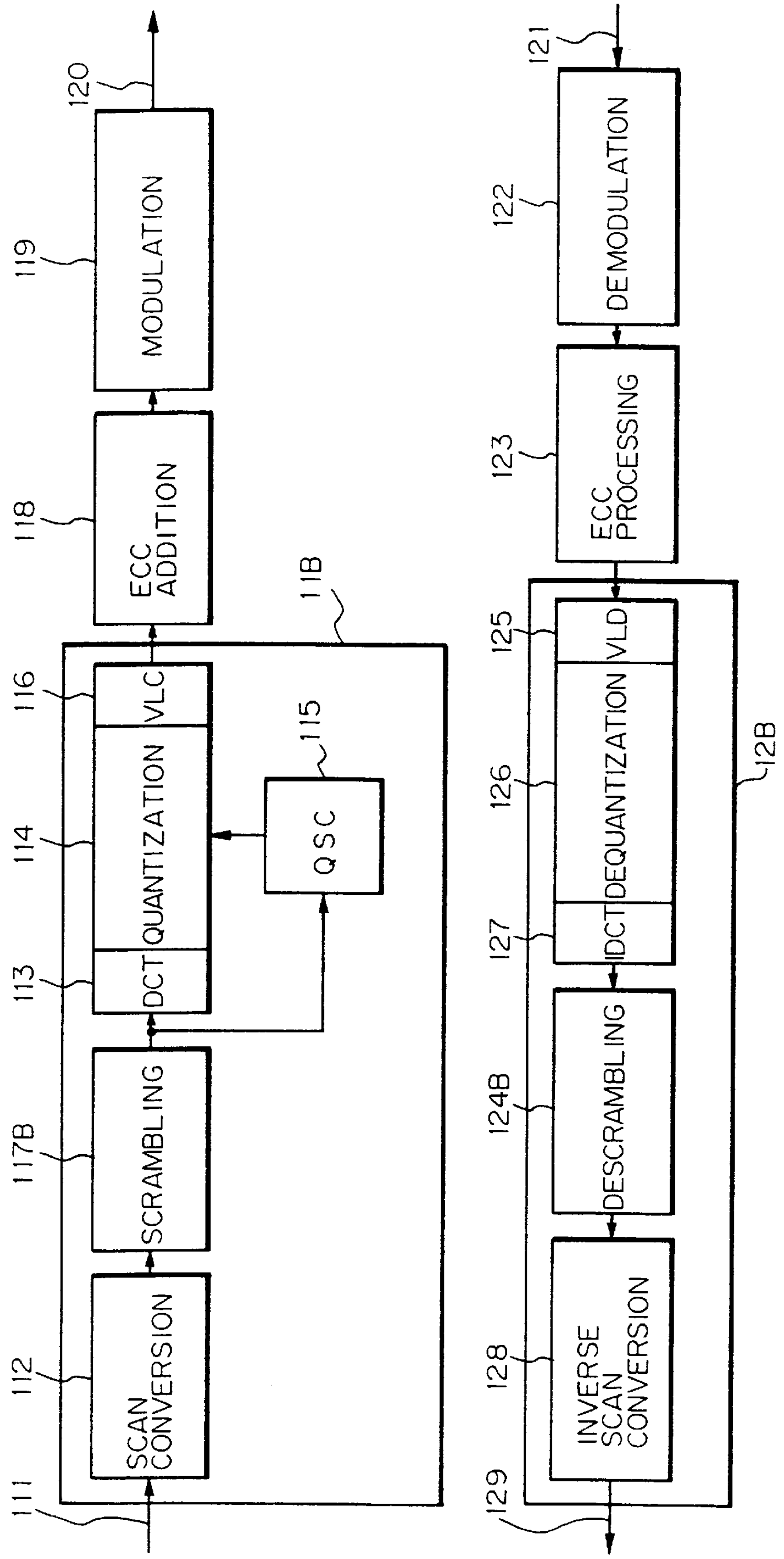

FIG. 11 shows still another alternative embodiment of the present invention. This embodiment is identical with the embodiment of FIG. 10 except for the scrambling system of the scrambling circuit and the descrambling system of the descrambling circuit. For this reason, a scrambling circuit and a descrambling circuit shows in FIG. 11 are labeled 117B and 124B, respectively. The scrambling circuit 117B receives a video signal compressed in the MPEG2 format and rearranges macroblock data within the individual slice in a particular order according to scrambling. The descrambling 124B restores the original order of the macroblocks.

Assume that a single slice has forty-five macroblocks, and that the scrambled outputs are divided on a six bit basis and dealt with as the order of pictures. Further, assume that the following divided six-bit scrambled outputs sequentially appear:

42, 34, 18, 6, 59, 24, 37, 51, 29, 32, 11, 42, . . .

Then, pictures are sent in the order of 42, 34, 18 and so forth. Because only macroblocks 0–44 of the forty-five macroblocks are valid, the fifth 59 is skipped, and in addition the second appearance of the twelfth 42 before the completion of the picture is skipped.

The macroblocks may be sent in the order of scrambling. Alternatively, the order of one round of the scrambled outputs may be stored ad repeatedly used thereafter.

The receiver can reproduce the above picture in the original order by decoding them with a scramble decoder, i.e., the descrambling 124B. Should the pictures be decoded without the scramble decoder, it would be reproduced in the rearranged order of macroblocks and would therefore be difficult to see.

Two or more of the picture scrambling within a group of pictures, the slice scrambling within a picture and the macroblock data scrambling within a slice described above may be combined, as follows.

Figure 12:
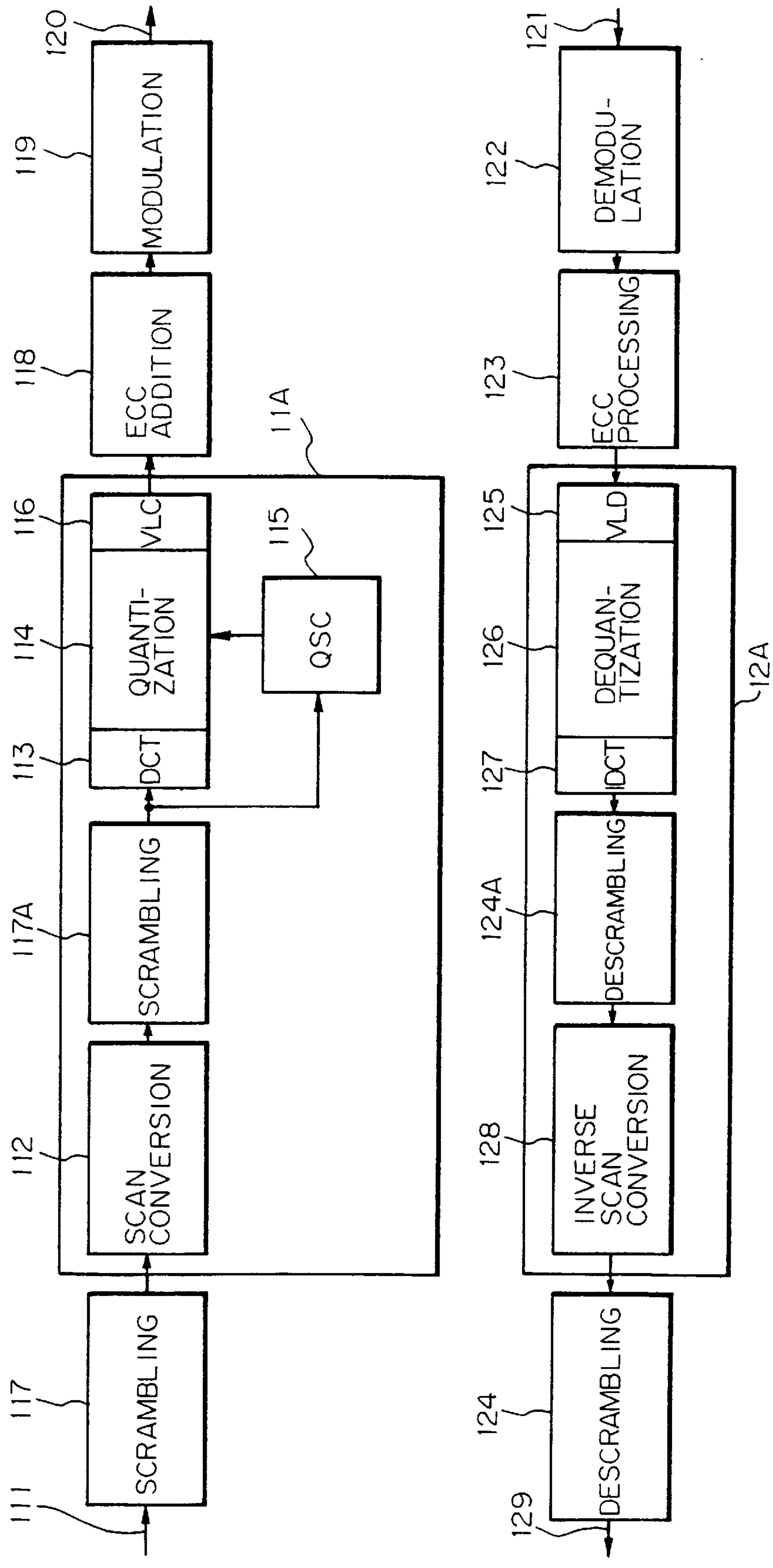
FIG. 12 is a block diagram schematically showing a combination of the embodiments shown in FIG. 9 and FIG. 10.

FIG. 12 shows an embodiment implemented by the picture scrambling within a group of pictures and the slice scrambling within a picture. As shown, the scrambling 117 and 117A respectively precede and follow the scan conversion 112. Also, the descrambling 124A and 124 respectively precede and follow the inverse scan conversion 128.

Figure 13:
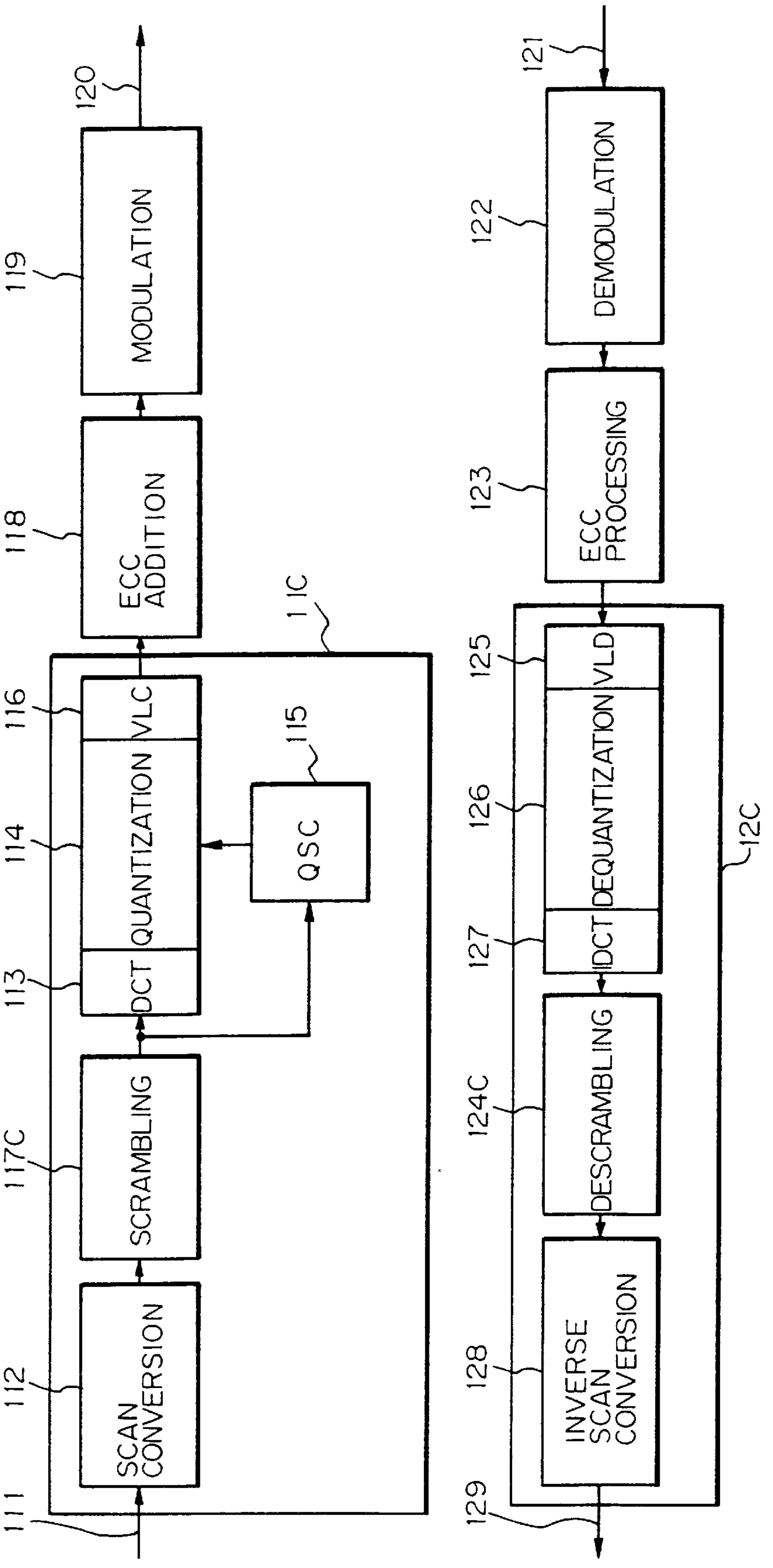
FIG. 13 is a block diagram schematically showing a combination of the embodiments shown in FIGS. 10 and 11.

FIG. 13 shows an embodiment implemented by the slice scrambling within a picture and the macroblock data scrambling within a slice. In FIG. 13, a scrambling and a descrambling are labeled 117C and 124C, respectively. Again, assume that a picture has thirty slices, and that the individual slice has forty-five macroblocks. Then, in this embodiment, five bits are selected at a time out of the scrambled outputs and used as a slice number. Subsequently, six bits are selected forty-five times and used as macroblock numbers. Such a procedure is repeated thirty times. Alternatively eleven bits (five bits for a slice number and six bits for a macroblock number) may be repeatedly selected 1,350 times (30×45 times), or serial numbers may be assigned to 1,350 macroblocks constituting a picture so as to repeat the selection of eleven bits 1,350 times. This is also true with the other combinations.

Rearranging preselected blocks within a preselected group and thereby scrambling the original video signal softly, as stated above, will sometimes be referred to as shuffling.

Further, soft scrambling based on the variable-length coding tables and soft scrambling (shuffling) based on the rerrangement of blocks may be combined, as follows.

Figure 14:
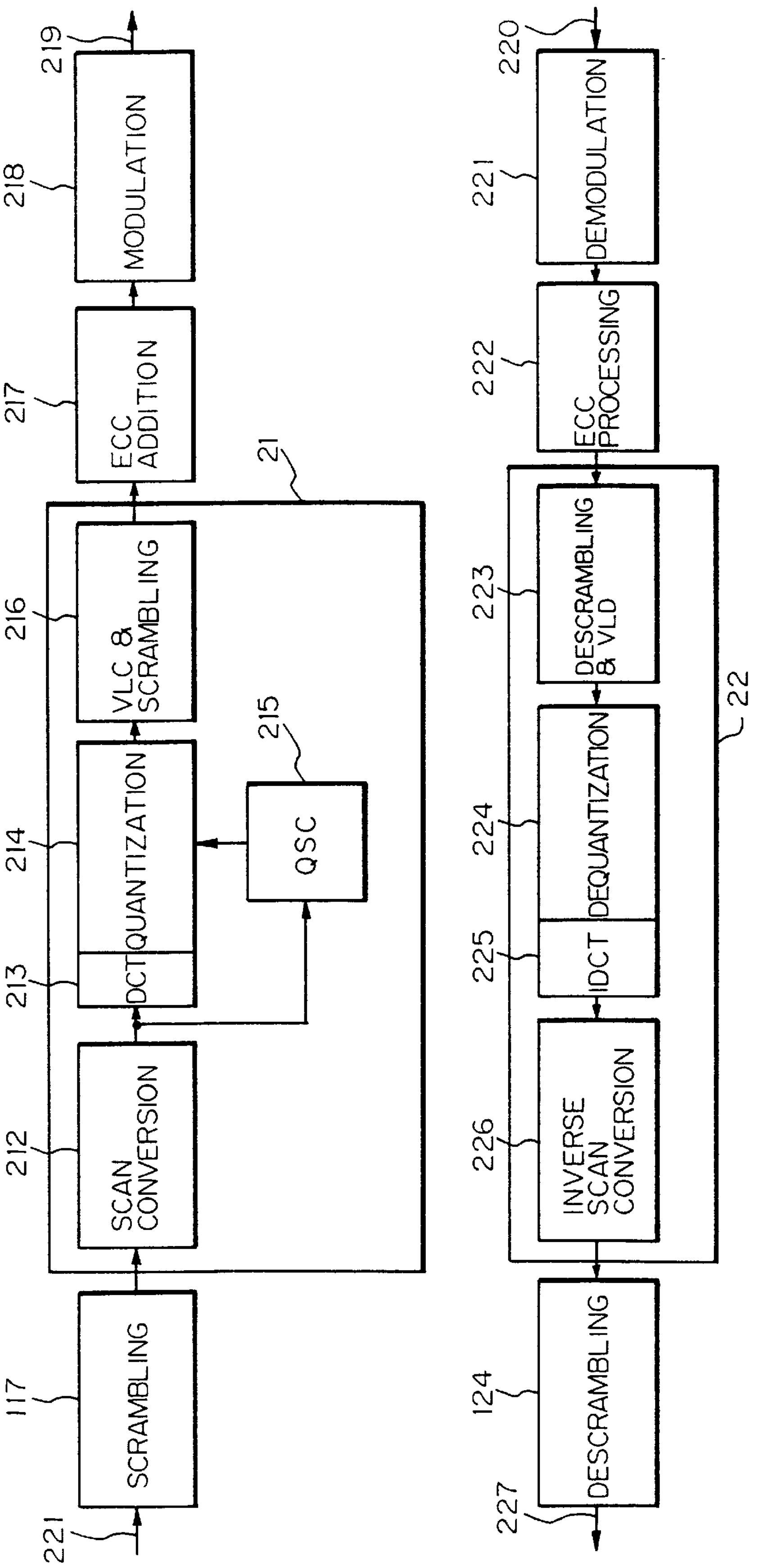
FIG. 14 is a beck diagram schematically showing a combination of the embodiments shown in FIGS. 2 and 9.
Figure 15:
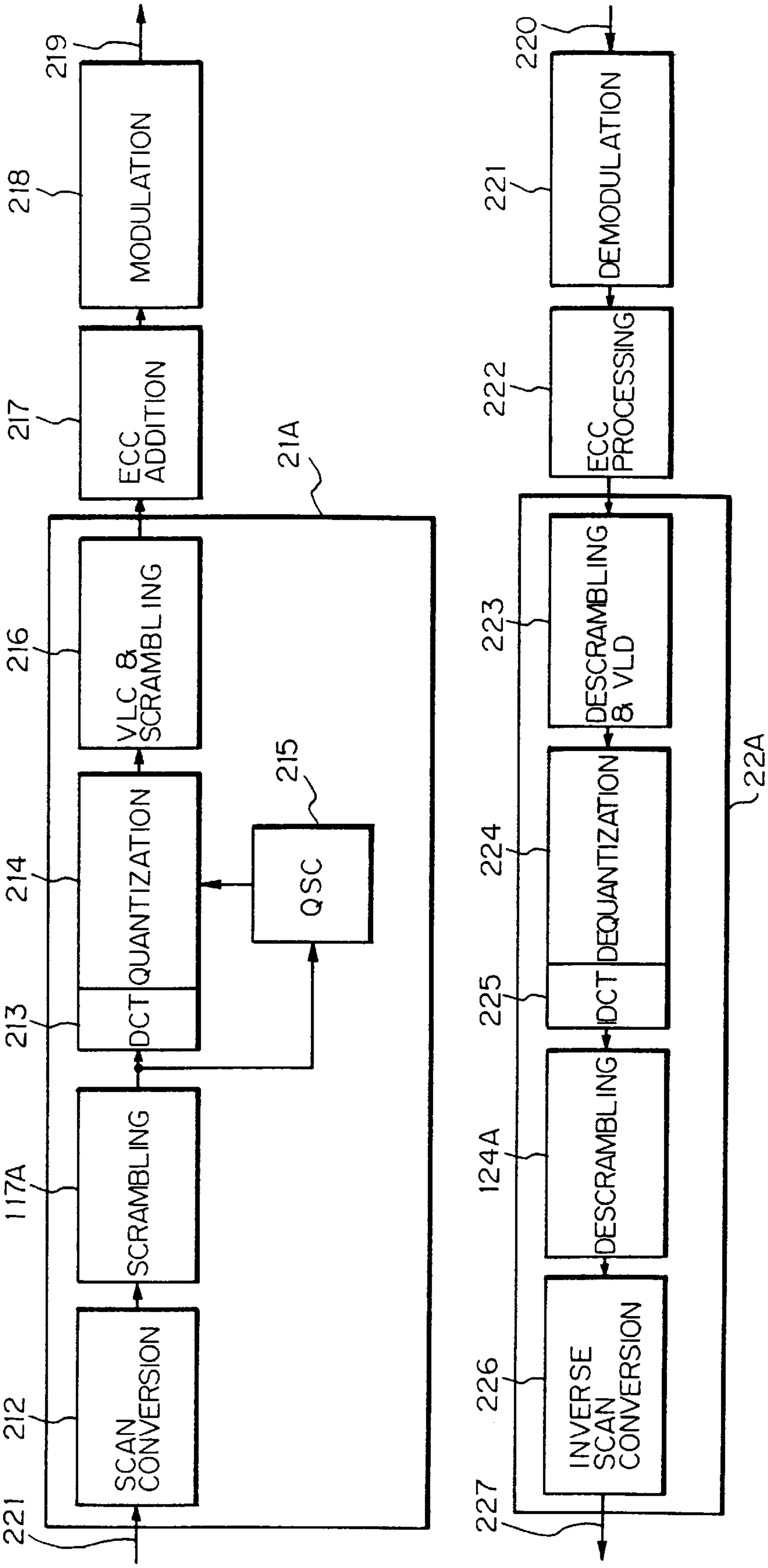
FIG. 15 is a block diagram schematically showing a combination of the embodiments shown in FIGS. 2 and 10.
Figure 16:
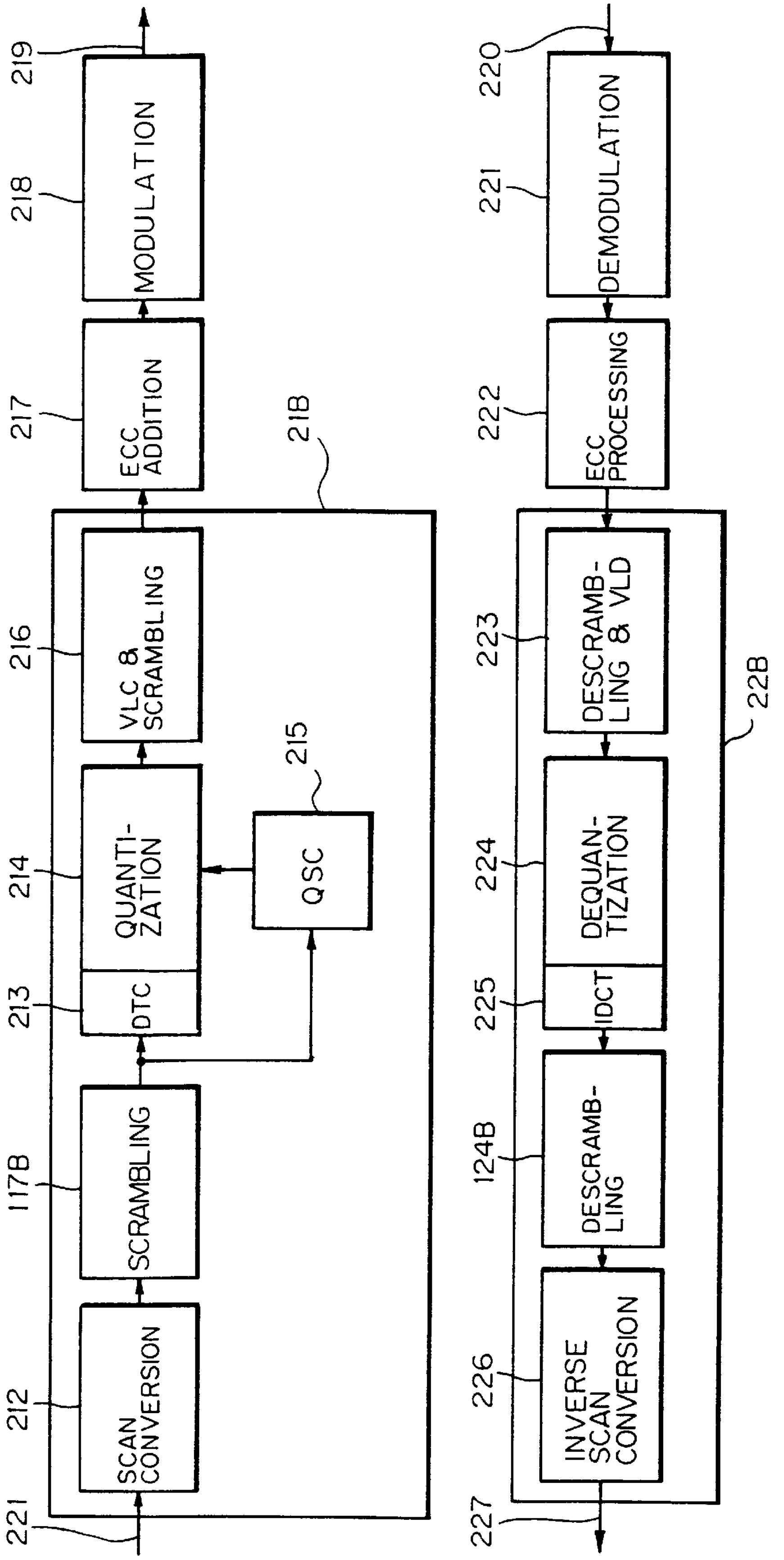
FIG. 16 is a block diagram schematically showing a combination of the embodiments shown in FIGS. 2 and 11.
Figure 17:
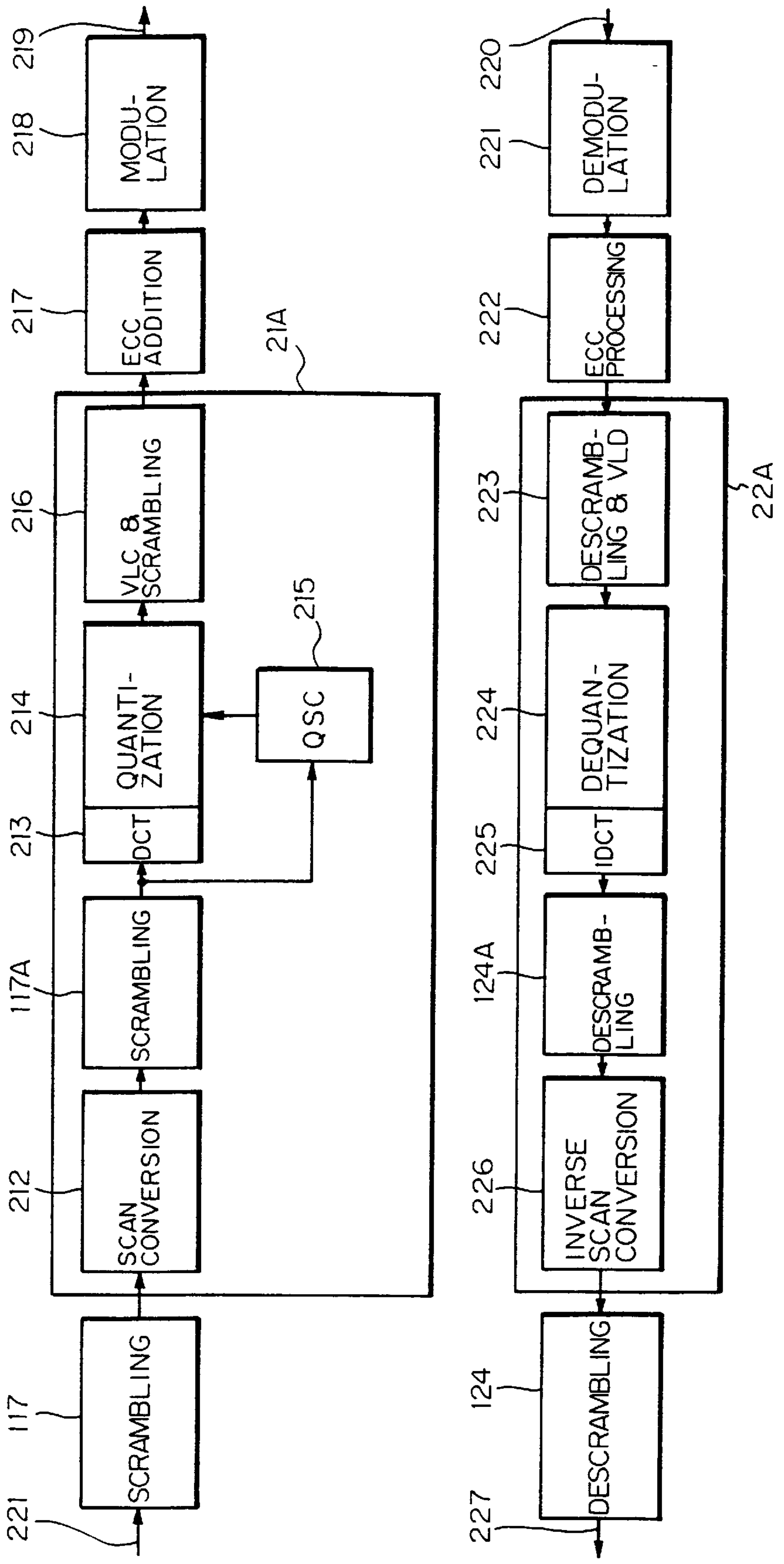
FIG. 17 is a block diagram schematically showing the embodiments shown in FIGS. 2, 9 and 10.

FIG. 14 shows an embodiment which is the combination of the embodiment of FIG. 2 and the embodiment of FIG. 9. FIG. 15 shows an embodiment which is the combination of the embodiment of FIG. 2 and the embodiment of FIG. 10. Further, FIG. 16 shows an embodiment which is the combination of the embodiment of FIG. 2 and the embodiment of FIG. 11. In addition, FIG. 17 shows an embodiment which is the combination of the embodiment of FIG. 2 and the embodiment of FIG. 10.

High frequency components and low frequency components may be separated from each other at any desired position. For example, only the DC components may be used as low frequency components, or all the components may be used as high frequency components. Further, the low frequency components may be implemented as a combination of a preselected number of runs/levels determined from the low frequency side, or a combination other than a combination determined from the high frequency side.

For orthogonal transform, DCT may be replaced with any other suitable scheme. While a four-pixel, four-line matrix has been used for DCT in the embodiments, it may be replaced with an eight-pixel, eight-line matrix, sixteen-pixel, eight-line matrix, sixteen-pixel, sixteen-line matrix or any other suitable matrix.

The VLC code tables may be replaced with other suitable tables.

While the compression scheme is not limited to the MPEG system, it should preferably be implemented by the combination of orthogonal transform, quantization, and variable-length coding. For example, use may be made of a JPEG (Joint Photographic coding Experts Group) format.

The scrambling circuit may be preset on a macroblock basis, slice basis, picture basis or group of picture basis. The generator polynomial applied to the random data generating circuit may be any suitable equation. The present invention is practicable even with a scrambling circuit using no generator polynomials.

In summary, in accordance with the present invention, a video transmitter executes soft scrambling with an original video signal before compressing it and then send the softly scrambled video signal. If a video receiver descrambles the scrambled data via a scramble decoder (descrambler), a subscriber having the receiver can enjoy complete video/audio data. However, when an unauthorized person decodes the descrambled data without a scramble decoder, the person is allowed to see only some patterns included in the picture. This will successfully encourage the unauthorized person to make subscription in order to enjoy the complete video/audio data.

Various modifications will become possible for those skilled in the art after receiving the teachings of the present disclosure without departing from the scope thereof.

What is claimed is:

1. A method of transmitting/receiving video, comprising:

compressing an original video signal by orthogonal transform, quantization, and variable-length encoding performed in this order, said variable-length encoding step including:

dividing a quantized video signal into high frequency components and low frequency components;

soft scrambling said high frequency components but not said low frequency components in an individual orthogonal transform block, said soft scrambling step including transforming said low frequency components in accordance with an original variable-length coding table to produce a first scrambled signal and then transforming said first scrambled signal in accordance with another variable-length coding table having a same number of bits to produce a second scrambled signal;

combining said second scrambled signal and said low frequency components into a combined signal; and transmitting said combined signal as a signal to be transmitted.

2. A method as claimed in claim 1, wherein said soft scrambling is effected such that if a receiver does not descramble the compressed video signal, the original video signal is reproduced to a degree allowing only some patterns to be recognizable.

3. A method as claimed in claim 2, wherein the signal to be transmitted is received as a received signal, the received signal is subjected to soft descrambling inverse to said soft scrambling to thereby reconstruct the compressed video signal, and a reconstructed video signal is expanded to thereby reproduce the original video signal.

4. A method as claimed in claim 1, wherein the signal to be transmitted is received as a received signal, the received signal is subjected to soft descrambling inverse to said soft scrambling to thereby reconstruct the compressed video signal, and a reconstructed video signal is expanded by variable-length coding, quantization and inverse orthogonal transform to thereby reproduce the original video signal.

5. A method as claimed in claim 1, wherein for said soft scrambling, all components are dealt with as high frequency components.

6. A method as claimed in claim 1, wherein the low frequency components not scrambled are only DC components.

7. A method as claimed in claim 1, wherein the Low frequency components not scrambled comprise a combination of DC components and a preselected number of runs/levels determined from a low frequency side.

8. A method as claimed in claim 1, wherein the high frequency components scrambled comprise a combination of a preselected number of runs/levels determined from a high frequency side toward a low frequency side of an end-of-block side.

9. A method as claimed in claim 1, wherein a distance between the original table and the other table is determined on the basis of scrambled data.

10. A method of transmitting/receiving a compressed video signal produced by compressing an original video signal, comprising steps of:

soft scrambling an original video signal in accordance with a first scrambling table to produce a first scrambled signal;

soft scrambling said first scrambled signal in accordance with a second scrambling table to produce a second scrambled signal, said first scrambling step and said second scrambling step being performed before compression;

compressing said second scrambled signal to form a compressed video signal; and transmitting the compressed video signal.

11. A method as claimed in claim 10, wherein said soft scrambling steps are effected such that if a receiver does not descramble the compressed video signal, the original video signal is reproduced to a degree allowing only some patterns to be recognizable.

12. A method as claimed in claim 10, wherein at least one of said soft scrambling steps comprises rearranging preselected unit blocks of the original video signal within a preselected group in a particular order.

13. A method as claimed in claim 10, wherein at least one of said soft scrambling steps comprises rearranging picture data within a group of pictures i a particular order.

14. A method as claimed in claim 10, wherein at least one of said soft scrambling steps comprises rearranging slice data within a picture in a particular order.

15. A method as claimed in claim 10, wherein at least one of said soft scrambling steps comprises rearranging macroblock data within a slice in a particular order.

16. A method as claimed in claim 10, wherein said soft scrambling steps comprise two of rearranging picture data within a group of pictures in a particular order, rearranging slice data within a picture in a particular order, and rearranging macroblock data within a slice in a particular order.

17. A method as claimed in claim 10, wherein the compressed video signal is received as a received signal, the received signal is expanded to thereby reconstruct a scrambled signal undergone said soft scrambling steps, and the descrambled signal is subjected to two soft descrambling steps respectively inverse to said soft scrambling steps to thereby reproduce the original video signal.

18. A method of transmitting/receiving a compressed video signal produced by compressing an original video signal, comprising:

main soft scrambling the original video signal before compression to produce a first scrambled signal, and then auxiliary soft scrambling the first scrambled signal at a same time the first scrambled signal is encoded by a variable-length encoder to thereby send a resulting compressed video signal as a signal to be transmitted.

19. A method as claimed in claim 18, wherein compression of the first scrambled signal includes subjecting the first scrambled signal to orthogonal transform, quantization and variable-length coding in this order to thereby produce the compressed video signal, wherein said main soft scrambling step comprises rearranging unit blocks within a preselected group in a particular order, and wherein said auxiliary soft scrambling step comprises scrambling high frequency components in an individual orthogonal transform block, but no scrambling low frequency components.

20. A method as claimed in claim 18, when said main scrambling comprises a combination of at least two of rearranging picture data within a group of pictures in a particular order, rearranging slice data within a picture in a particular order, and rearranging macroblock data within a slice in a particular order.

21. A method as claimed in claim 18, wherein auxiliary soft descrambling inverse to said auxiliary soft scrambling is effected with the received signal to thereby reconstruct the compressed video signal, a reconstructed compressed video signal is expanded to reconstruct a signal undergone said main soft scrambling, and then main soft descrambling inverse to said main soft scrambling is effected with a reconstructed signal undergone said main soft scrambling to thereby reproduce the original video signal.

22. A video transmitter/receiver comprising:

compressing means for compressing an original video signal to thereby output a compressed video signal;

scrambling means, within said compressing means, for soft scrambling said original video signal at a same time a variable-length encoder within said compressing means encodes said original video signal; and transmitting means for sending a resulting signal as a signal to be transmitted.

23. A video transmitter/receiver as claimed in claim 22, wherein said compressing means comprises:

orthogonal transforming means for executing orthogonal transform with the original video signal to thereby output a transformed signal;

quantizing means for quantizing the transformed signal to thereby output a quantized signal; and variable-length coding means for executing variable-length coding with the quantized signal to thereby output the compressed video signal;

said scrambling means effecting sad soft scrambling by scrambling, in an individual orthogonal transform block, high frequency components, but not scrambling low frequency components.

24. A video transmitter/receiver as claimed in claim 22, further comprising:

descrambling means for executing soft descrambling inverse to said soft scrambling with a received signal, which is the signal to be transmitted, to thereby reconstruct the compressed video signal; and expanding means for expanding a reconstructed compressed video signal output from said descrambling means to thereby reproduce the original video signal.

25. A video transmitter/receiver comprising:

a first scrambling means for soft scrambling an original video signal in accordance with a first scrambling table to thereby output a first scrambled signal;

a second soft scrambling for soft scrambling said first scrambled signal in accordance with a second scrambling table to produce a second scrambled signal;

compressing means for compressing the second scrambled signal to thereby output a compressed video signal; and a transmitting means for transmitting the compressed video signal.

26. A video transmitter/receiver as claimed in claim 25, wherein at least one of said first and second scrambling means rearranges unit blocks within a preselected group in a particular order.

27. A video transmitter/receiver as claimed in claim 26, wherein said compressing means comprises:

orthogonal transforming means for executing an orthogonal transform with the second scrambled signal to thereby output a transformed signal;

quantizing means for quantizing the transformed signal to thereby output a quantized signal; and variable-length coding means for executing variable-length coding with the quantized signal to thereby output the compressed video signal.

28. A video transmitter/receiver as claimed in claim 25, further comprising:

expanding means for expanding a received signal, which is the signal to be sent, to thereby output the second scrambled signal; and descrambling means for executing soft descrambling of said second scrambled signal output from said expanding means, said descrambling being inverse to said soft scrambling performed by said first scrambling means and said second scrambling means to thereby reproduce the original video signal.

29. A video transmitter/receiver comprising:

main scrambling means for executing main soft scrambling of an original video signal to thereby output a main scrambled signal;

compressing means for compressing the main scrambled signal to thereby output a compressed video signal;

auxiliary scrambling means for executing auxiliary soft scrambling at a same time a variable-length encoder encodes the main scrambled signal to thereby output a compressed auxiliary scrambled signal; and transmitting means for transmitting the auxiliary scrambled signal.

30. A video transmitter/receiver as claimed in claim 29, wherein said main scrambling means executes said main soft scrambling by rearranging preselected unit blocks within a preselected group in a particular order.

31. A video transmitter/receiver as claimed in claim 30, wherein said compressing means comprises:

orthogonal transforming means for executing orthogonal transform with the main scrambled signal to thereby output a transformed signal;

quantizing means for quantizing the transformed signal to thereby output a quantized signal; and variable-length coding means for executing variable-length coding with the quantized signal to thereby output the compressed video signal;

said auxiliary scrambling means executing said auxiliary soft scrambling by scrambling, within an individual orthogonal transform block, high frequency components, but not scrambling low frequency components.

32. A video transmitter/receiver as claimed in claim 31, wherein said main scrambling means executes at least one of rearranging picture data within a group of pictures in a particular order, rearranging slide data within a picture in a particular order, and rearranging macroblock data within a slice in a particular order.

33. A video transmitter/receiver as claimed in claim 29, further comprising:

auxiliary descrambling means for executing auxiliary descrambling inverse to said auxiliary soft scrambling with a received signal, which is the signal to be transmitted, to thereby reconstruct the compressed video signal;

expanding means for expanding a reconstructed compressed video signal output from said auxiliary descrambling means to thereby reconstruct the main scrambled signal; and main descrambling means for executing main soft descrambling inverse to said main soft scrambling with a reconstructed main scrambled signal output from said expanding means to thereby reproduce the original video signal, wherein auxiliary soft descrambling inverse to said auxiliary soft scrambling is effected with the received signal to thereby reconstruct the compressed video signal, a reconstructed compressed video signal is expanded to reconstruct a signal undergone said main soft scrambling, and then main soft descrambling inverse to said main soft scrambling is effected with a reconstructed signal undergone said main soft scrambling to thereby reproduce the original video signal.

* * * * *